April 13, 1965      H. M. UMANN      3,178,557
WATER HEATING UNIT

Filed Oct. 8, 1962      2 Sheets-Sheet 1

HARRY M. UMANN
INVENTOR.

BY *Lyon & Lyon*
ATTORNEYS

HARRY M. UMANN
INVENTOR.

BY Lyon+Lyon
ATTORNEYS

United States Patent Office 3,178,557
Patented Apr. 13, 1965

3,178,557
WATER HEATING UNIT
Harry M. Umann, 359 N. Bristol Ave.,
Los Angeles 49, Calif.
Filed Oct. 8, 1962, Ser. No. 228,995
12 Claims. (Cl. 219—314)

The present invention relates to a means for heating liquids. More particularly, the present invention relates to a means which may be connected to a source of cold water and which will provide, almost instantaneously, hot water when put into operation. While the device of the present invention may be used to heat liquid to any desired temperature, this device is especially useful in the heating of water to temperatures near the boiling temperature, i.e., to a temperature which renders the water suitable for addition to powdered coffee, tea, soup, et cetera, with the result that a liquid solution is produced which may be consumed directly.

Although many attempts have been made to provide water heating units which will supply water at temperatures near the boiling temperature, none of these attempts have been completely satisfactory. One of the principal deficiencies in prior art units, in those instances where the units are connected to cold water sources, has been the substantial delay, usually on the order of about five minutes, required to heat the water to the desired temperature. It is, of course, desirable that such units be connected to cold water sources because of the substantial expense which would otherwise be required to heat the water at the source rather than in the unit. Another difficulty which has often been associated with prior art units is that they have required maid service for the filling of the container in the unit with cold water which is to be heated by the unit. The necessity for maid service has resulted from both the complicated construction of many prior art units and the necessity for preventing the user from contacting the heater in the unit in order to avoid accidental burning of the user by the heater. The present invention obviates these difficulties and, as will become apparent from the description contained herein, is ideally suited for use in hotels and motels as a means for delivering hot water almost instantaneously.

One of the principal objects of this invention is to provide a novel and improved device for automatically and almost instantaneously heating liquid.

Another object of this invention is to provide a self-contained liquid heating unit which will deliver hot liquid almost instantaneously and which may conveniently be filled by the user.

It is a further object of the present invention to provide a device for heating water which is particularly suitable for use in hotels and motels.

A still further object of this invention is to provide a liquid heating unit of the type referred to which is highly effective in operation, yet simple in construction and adapted to be manufactured economically on a quantity basis.

Other objects and advantages of this invention, it is believed, will be readily apparent from the following detailed description of preferred embodiments thereof when read in conjunction with the accompanying drawings.

In the drawings:

FIGURE 3 illustrates, in horizontal cross section, a portion of the heating unit of the present invention.

FIGURE 4 illustrates the manner in which the removable reservoir of the present invention may be filled with water from a conventional faucet.

FIGURES 5 and 6 illustrate the flap valve located in the lower end of the reservoir in its closed and open, respectively, condition.

FIGURE 7 is a wiring diagram illustrating the electrical connections incorporated in the device of this invention.

Briefly, the present invention comprises a heating unit which is provided with a container, an immersion heating element and a thermostat. The thermostat and the heating element are connected such that the heating element will maintain the liquid in the container at a desired predetermined temperature. This heating unit is also connected to a supply of cold liquid, e.g., water. When it is desired to remove a quantity of heated water from the unit, the heated water is passed through a conduit and into a receiving container. At the same time a like quantity of cold water is admitted to the container of the heating unit. An important feature of the preferred embodiment of the present invention comprises positioning the inlet means for the cold water entering the heating unit such that the incoming water is directed at the sensing area of the thermostat. This has the result of causing the thermostat to sense a lower temperature than the average temperature of the entire mass of water in the container of the heating unit and causes the heating unit to bring the water therein to the desired temperature at a more rapid rate than would otherwise occur. Another important feature of the present invention is that the heating unit may be removably connected to a reservoir which may serve as a source of cold liquid.

Figure 1:
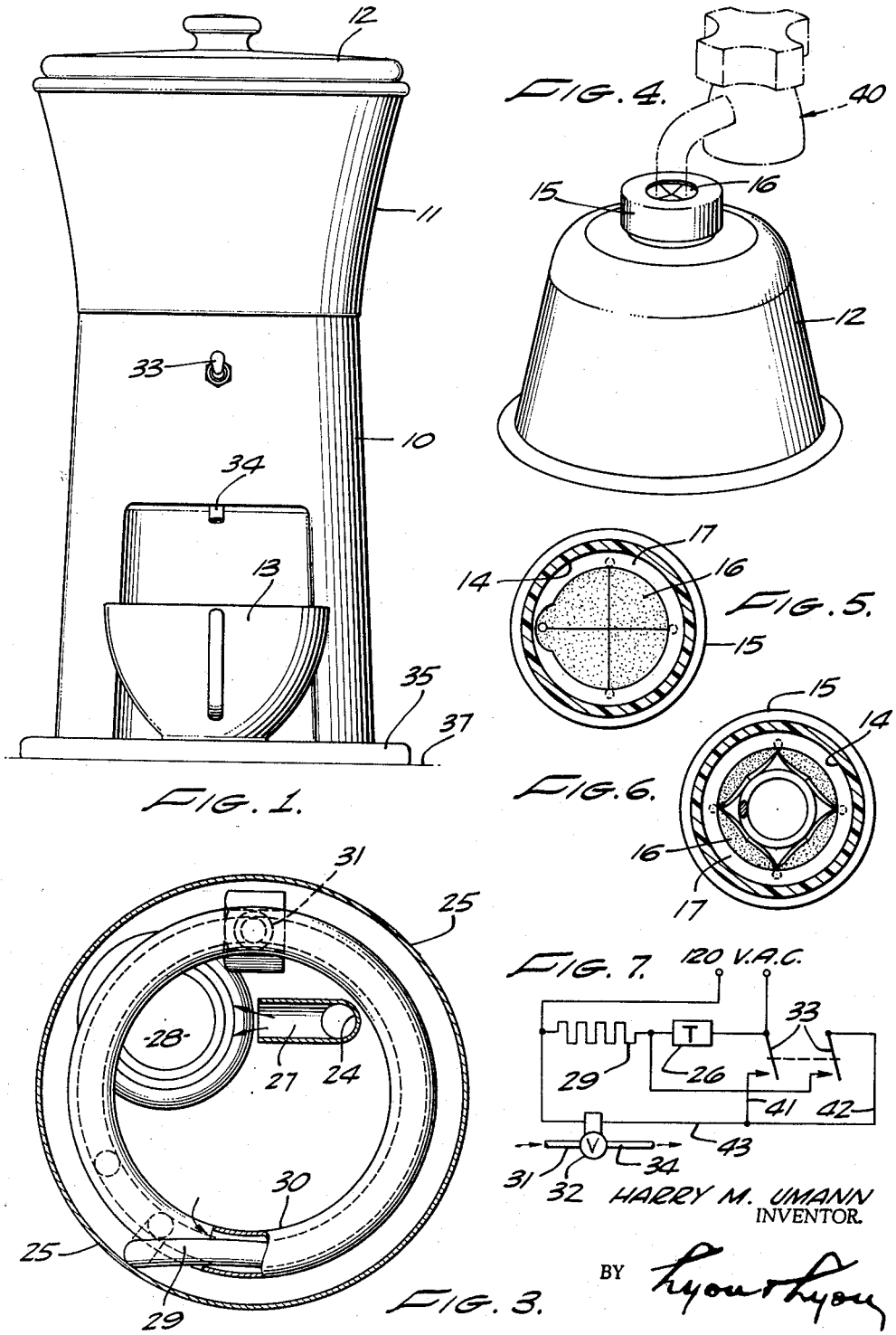
FIGURE 1 illustrates the exterior of a preferred embodiment of the present invention.

Referring now to the drawings, the exterior of a preferred embodiment of the present invention comprising lower housing 10, upper housing 11 and reservoir 12 is illustrated in FIGURE 1. Cup 13 which is positioned so as to receive heated water from the unit is also illustrated in FIGURE 1.

Figure 2:
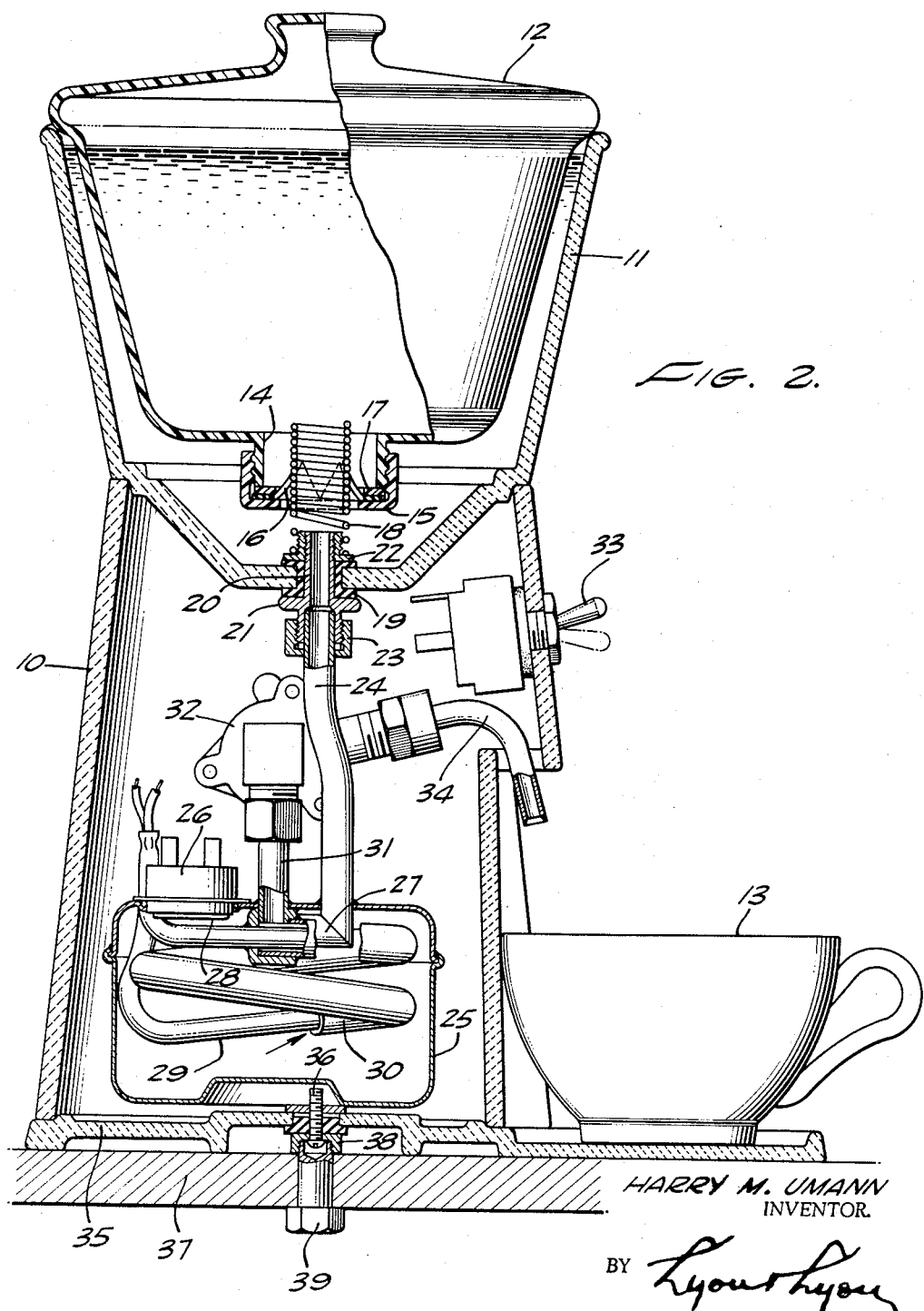
FIGURE 2 illustrates, in vertical cross section, a preferred embodiment of the present invention.

FIGURE 2 illustrates a preferred embodiment of the present invention in vertical cross section. As clearly shown in this figure, reservoir 12 is provided with an aperture defined by wall 14. A fitting 15 is securely connected, by a threaded connection, to wall 14. Fitting 15 contains flap valve 16 and gasket 17 and urges them into abutting relation with the lower extremity of wall 14. When the unit is assembled as illustrated in FIGURE 2, flap valve 16 is forced open by spring 18.

The lower end of upper housing 11 is provided an aperture in which is positioned gasket 19. A fitting 20 having a generally cylindrical configuration and a threaded portion at each end thereof is positioned in gasket 19. Fitting 20 is also provided with projection 21 which abuts against the lower end of gasket 19. A seat 22 is attached to the upper end of fitting 20 by means of a threaded connection and abuts against the upper end of gasket 19. The lower end of spring 18 rests on seat 22. The lower end of fitting 20 is provided with collar 23 which is attached thereto by a threaded connection. Conduit 24 is positioned in the lower end of fitting 20 and is sealed therein by means of collar 23.

The lower end of conduit 24 is positioned in preheater tank 25. Tank 25 is also provided with thermostat 26. As is most clearly illustrated in FIGURE 3, the outlet 27 of conduit 24 is positioned such that the liquid flowing therethrough is directed at sensing area 28 of thermostat 26. Tank 25 is also provided with immersion heater element 29, and the heater element is provided with annular sleeve 30. Thus, the outer surface of heater element 29 and the inner surface of sleeve 30 form an annulus through which liquid may flow to conduit 31. As is illustrated in the drawing, only a portion of heating element 29 is provided with sleeve 30, the remainder of the heating element being directly exposed to the liquid in tank 25.

The upper end of conduit 31 is provided with solenoid valve 32. Switch 33 is connected with valve 32 in such a manner that the valve is actuated by the switch. Solenoid valve 32 is provided with conduit 34.

As shown in FIGURE 2, lower housing 10 is attached to base 35 by screw 36. Base 35 may be attached to any desired surface 37, e.g., a table top, by means of collar 38 and bolt 39.

FIGURE 3 illustrates, in horizontal cross section, tank 25, outlet 27, sensing area 28 of thermostat 26, immersion heating element 29 and sleeve 30. The relation of these elements has previously been described with reference to FIGURE 2.

FIGURE 4 illustrates pictorially the manner in which reservoir 12 may be filled by water from the faucet indicated generally by numeral 40.

FIGURE 5 illustrates, in partial horizontal cross section, flap valve 16 in its closed condition.

FIGURE 6 illustrates, in partial cross section, flap valve 16 in its open condition in which the flaps are forced open by spring 18.

Referring now to the wiring diagram of FIGURE 7, it will be seen that the solenoid valve 32 is connected to wires 41 and 42 by means of wire 43. Therefore, when switch 33 is closed, current is passed through valve 32. The circuit through thermostat 26 and heater element 29 is continuously energized.

The operation of the preferred embodiment of the present invention which has previously been described is extremely simple. The reservoir 12 is first filled with a liquid, e.g., water, as shown in FIGURE 4. The reservoir 12 is then inserted into upper housing 11. This insertion causes flap valve 16 to come into contact with the upper end of spring 18 and, as the reservoir is lowered, spring 18 opens valve 16. When valve 16 has been opened, gravity causes the water in reservoir 12 to flow through valve 16 and through tubular fitting 20 and conduit 24 into tank 25. The water flowing through valve 16 will also fill the space between upper housing 11 and reservoir 12. As most clearly shown in FIGURE 3, the water entering tank 25 is directed at sensing area 28 of thermostat 26. Thermostat 26 controls the heat output of heating element 29. Therefore, by making a predetermined adjustment of thermostat 26, the water in tank 25 may be heated to any desired temperature. It has been found that, if the device of the present invention is to be used to provide hot water for making coffee from instant coffee, satisfactory results obtained by setting the thermostat such that the water in tank 25 will be heated to a temperature of about 100 degrees F.

When hot water is desired, the user merely closes switch 33. This causes solenoid valve 32 to be opened and the force of gravity forces the water in tank 25 through the annulus between heating element 29 and sleeve 30 into conduit 31, through valve 32 and into conduit 34 which directs the water into cup 13. When the water from tank 25, which has been preheated to a temperature of about 100 degrees F., passes through the annulus between heating element 29 and sleeve 30 it is heated to a temperature extremely close to boiling, i.e., about 200 degrees F. This additional heating occurs because the thin film of water passing through the annulus is heated to a much higher temperature by heating element 29 than is the mass of water in tank 25 because the unit heat per unit weight of water supplied to the water in the annulus is much greater than that supplied to the water in the tank. Because the water in the tank is preheated to a uniform temperature, it is possible to design the water heating unit of the present invention so as to reliably deliver into the cup water heated to the desired uniform temperature. The present invention thus achieves a highly desirable result in an unexpectedly simple manner.

Another important feature of the present invention resides in the arrangement whereby the incoming water delivered by inlet 27 is directed at the sensing area 28 of thermostat 26. Thus, as the hot water is delivered to the cup 13 from tank 25, the water in the tank is continuously replaced with cold water from the reservoir. Simultaneously with the removal of the preheated water from the tank 25, the incoming cold water contacts the sensing area 28 of the thermostat thereby causing the thermostat to sense a much lower temperature than that which prevails in the preheated water in the tank. This causes the thermostat to energize the heating element 29 before it would otherwise do so. This arrangement also causes the thermostat to continue to energize the heating element for a period of time after the switch is thrown to stop the flow of water into the cup. Therefore, the end result of this arrangement is that a conventional thermostat is caused to maintain the temperature of the water at a higher level than it would do if it were positioned anywhere else in the assembly. This means that a conventional inexpensive thermostat is, because of the arrangement employed in the present invention, caused to function in a manner which is ordinarily characteristic only of expensive and unusual thermostats.

The present invention eliminates the delay ordinarily associated with water heaters of the same general type as that disclosed herein because the cold water which enters tank 25 as heated water is being withdrawn from the device is heated to the desired predetermined temperature within the time required to fill a cup with heated water and replace the full cup with an empty cup.

It will be readily apparent to those skilled in the art that the present invention is not limited to the preferred embodiment previously described, but may be used in any environment in which immediate delivery of heated liquid is desired. For example, the present invention is readily adapted to be connected to a conventional cold water faucet to heat the water flowing therefrom. It may also be used in clothes washers, dish washers, photographic film washers and the like. It is also to be understood, however, that the preferred embodiment described herein is itself possessed of novel and unexpected features which render it a valuable and inventive contribution to the art.

Having fully described my invention, it is to be understood that I do not wish to be limited to the details set forth, but my invention is of the full scope of the appended claims.

I claim:

1. An apparatus for heating liquids comprising a first container and a second container, said first container being positioned above said second container so as to be capable of supplying liquid to said second container, a thermostat mounted in said second container, an inlet means in said second container, said inlet means being in communication with said first container and being positioned such that liquid flowing therethrough will be directed at said thermostat, a heating element mounted in said second container and operatively connected to said thermostat for control thereby, an annular sleeve member mounted in said second container spaced from and surrounding at least a portion of said heating element, an outlet means in said second container, said sleeve being connected to said outlet means.

2. The apparatus of claim 1 wherein said first container is provided with an aperture in one end thereof, said aperture being in communicaion with said inlet in said second container.

3. The apparatus of claim 2 wherein a valve is mounted in said aperture, said apparatus being provided with a means for holding said valve in the open position, thereby permitting flow of liquid from said first container to said second container.

4. The apparatus of claim 3 wherein said valve is a flap valve.

5. The apparatus of claim 2 wherein said first container is mounted in a housing, and said inlet means and said aperture in said first container are in communicating relationship with said housing.

6. The apparatus of claim 1 wherein said outlet means is provided with a valve, said valve being adapted to be actuated by a solenoid.

7. The apparatus of claim 6 wherein said second container is mounted in a housing, said housing being provided with a switch, said switch being adapted to actuate said solenoid.

8. An apparatus for heating liquid comprising a first container and a second container, said first container being positioned above said second container, a first housing, said first container being mounted in said first housing and in communication therewith, said first container being provided with a valve in the lower end thereof, means mounted on said first housing adapted to continuously open said valve, a conduit having one end connected to said first housing and the other end connected to said second container, a thermostat mounted in said second container, an electric heating element mounted in said second containner and electrically connected to said thermostat, the end of said conduit which is positioned in said container being positioned such that fluids flowing therethrough are directed at said thermostat, an annular sleeve spaced from and surrounding at least a portion of said heating element, outlet means in said second container, said second container being a closed container except for said inlet means and said outlet means, said outlet means being connected to said sleeve, a solenoid valve connected to said outlet means, discharge means connected to said solenoid valve, a second housing surrounding said second container, and a switch mounted on said second housing, said switch being adapted to actuate said solenoid.

9. The apparatus of claim 8 wherein the valve in said first container is a flap valve and the means for opening said flap valve comprises a spring.

10. The apparatus of claim 8 wherein said first container is removably mounted in said first housing.

11. The apparatus of claim 8 wherein said second housing is securely mounted on a base, said base being adapted to be securely mounted to a surface.

12. The apparatus of claim 8 wherein said first container, said second container and said discharge means are arranged such that gravitational forces alone are sufficient to cause liquid to flow from said first container into said second container and through said discharge means.

References Cited in the file of this patent
UNITED STATES PATENTS

| | | |
|---|---|---|
| 1,019,427 | Cubitt | Mar. 5, 1912 |
| 1,452,311 | Parkhurst | Apr. 17, 1923 |
| 1,864,887 | Bodenstab | June 28, 1932 |
| 1,920,013 | Green | July 25, 1933 |
| 2,215,688 | Chamberlain | Sept. 24, 1940 |
| 2,288,240 | Herman | June 30, 1942 |
| 2,568,474 | Van Sciver | Sept. 18, 1951 |
| 2,643,322 | Lime et al. | June 23, 1953 |
| 2,784,291 | Harney | Mar. 5, 1957 |
| 2,894,109 | Kendon | July 7, 1959 |
| 2,912,142 | Schultz | Nov. 10, 1959 |